United States Patent
Sun et al.

(10) Patent No.: US 11,502,942 B1
(45) Date of Patent: Nov. 15, 2022

(54) ACTIVE MESH NETWORK SYSTEM AND METHOD

(71) Applicant: AVIATRIX SYSTEMS, INC., Santa Clara, CA (US)

(72) Inventors: Yixin Sun, San Ramon, CA (US); Colby Wen, Pleasanton, CA (US); Xiaobo Sherry Wei, Palo Alto, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 69 days.

(21) Appl. No.: 17/079,399

(22) Filed: Oct. 23, 2020

Related U.S. Application Data

(60) Provisional application No. 62/982,679, filed on Feb. 27, 2020.

(51) Int. Cl.
*H04L 45/24* (2022.01)
*H04L 12/66* (2006.01)
*H04L 12/46* (2006.01)
*H04L 67/1029* (2022.01)
*G06F 9/455* (2018.01)
*H04L 67/1087* (2022.01)

(52) U.S. Cl.
CPC ......... *H04L 45/24* (2013.01); *G06F 9/45558* (2013.01); *H04L 12/4633* (2013.01); *H04L 12/66* (2013.01); *H04L 67/1029* (2013.01); *H04L 67/1087* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,874,755 B1 | 10/2014 | Deklich et al. | |
| 9,455,959 B1 * | 9/2016 | Garg | H04L 63/0281 |
| 10,491,466 B1 | 11/2019 | Hira et al. | |
| 11,388,227 B1 | 7/2022 | Sun et al. | |
| 2005/0074015 A1 | 4/2005 | Chari et al. | |
| 2010/0125903 A1 | 5/2010 | Devarajan et al. | |
| 2010/0306572 A1 | 12/2010 | Salvarani et al. | |

(Continued)

FOREIGN PATENT DOCUMENTS

GB    2551792 A  *  1/2018  ............. H04L 12/66

OTHER PUBLICATIONS

U.S. Appl. No. 17/186,911, filed Feb. 26, 2021 Non-Final Office Action dated Sep. 8, 2021.

(Continued)

*Primary Examiner* — Rebecca E Song
(74) *Attorney, Agent, or Firm* — Rutan & Tucker, LLP

(57) ABSTRACT

According to one embodiment, a network system features a first virtual private cloud (VPC) network and a second VPC network. The first VPC network includes a first plurality of gateways. Each gateway of the first plurality of gateways is in communications with other gateways of the first plurality of gateways in accordance with a first tunnel protocol. Similarly, a second VPC network includes a second plurality of gateways. Each of the second plurality of gateways is communicatively coupled to the each of the first plurality of gateways in accordance with a second security protocol to provide redundant routing.

19 Claims, 11 Drawing Sheets

(56) References Cited

U.S. PATENT DOCUMENTS

| | | |
|---|---|---|
| 2012/0008503 A1 | 1/2012 | Qiu et al. |
| 2013/0286846 A1 | 10/2013 | Atlas et al. |
| 2018/0062880 A1 | 3/2018 | Yu et al. |
| 2018/0069716 A1 | 3/2018 | Bhat et al. |
| 2018/0083859 A1 | 3/2018 | Barnum et al. |
| 2018/0176073 A1 | 6/2018 | Dubey et al. |
| 2019/0097940 A1 | 3/2019 | Cheng et al. |
| 2019/0158605 A1 | 5/2019 | Markuze et al. |
| 2019/0280927 A1 | 9/2019 | Filsfils et al. |
| 2020/0067734 A1 | 2/2020 | Hira et al. |
| 2020/0092194 A1 | 3/2020 | Tillotson et al. |
| 2020/0288386 A1 | 9/2020 | Glazemakers et al. |
| 2020/0336420 A1 | 10/2020 | Joshi et al. |
| 2021/0036889 A1* | 2/2021 | Jain .................. H04L 45/64 |
| 2021/0044512 A1 | 2/2021 | Deb et al. |
| 2021/0083967 A1 | 3/2021 | Joshi et al. |
| 2021/0168056 A1 | 6/2021 | Qian et al. |
| 2021/0218598 A1 | 7/2021 | Ganapathy et al. |
| 2021/0328891 A1 | 10/2021 | Cherkas |
| 2022/0046061 A1* | 2/2022 | Janakiraman ....... H04L 63/0263 |

OTHER PUBLICATIONS

U.S. Appl. No. 17/186,911, filed Feb. 26, 2021 Notice of Allowance dated Mar. 9, 2022.
Bhamare, et al., "Multi-Claud Distribution of Virtual Functions and Dynamic Service Deployment OpenADN Perspective." IEEE, 2015 Retrieved from URL: http//citeseerx.ist.psb.edu/viewdoc/download. 2015.
PCT/US2022/016196 filed Feb. 11, 2022 International Search Report and Written Opinion dated Jun. 2, 2022.

* cited by examiner

ACTIVE MESH NETWORK SYSTEM AND METHOD

CROSS-REFERENCE TO RELATED APPLICATIONS

This application claims the benefit of priority on U.S. Patent Application No. 62/982,679 filed Feb. 27, 2020, the entire contents of which are incorporated by reference herein.

FIELD

Embodiments of the disclosure relate to the field of networking. More specifically, one embodiment of the disclosure relates to a load-balanced, full-mesh network architecture configured to mitigate communication disruptions, especially between virtual private clouds (VPCs) within a public cloud network.

GENERAL BACKGROUND

Over the past few years, cloud computing has provided an Infrastructure as a Service (IaaS), where resources are provided as part of a cloud computing platform (e.g., public cloud network) and made accessible to tenants as a service. One of these services allows tenants to run software components (e.g., virtual machines instances such as virtual servers) residing within the cloud computing platform. Hence, the migration of software functionality into cloud computing platforms has led to greater usage of virtual private cloud networks (VPCs).

A virtual private cloud network (VPC) is an on-demand, configurable pool of shared resources, which are allocated within the cloud computing platform and provide a certain level of isolation between the different organizations or other entities (hereinafter, "users") using the resources. The isolation between one VPC user from other users of the same cloud computing platform may be achieved through allocation of a private Internet Protocol (IP) subnet and a virtual communication construct (e.g., virtual local area network "VLAN" or other protected communications) per user. For example, Amazon® Web Services (AWS®) provides for the purchase of Amazon® Elastic Compute Cloud (EC2) services with dedicated data processing capabilities for a particular user.

Currently, certain cloud computing platforms provide connectivity between VPCs. This connectivity, sometimes referred to as "peering," constitutes an establishment of peer-to-peer communications between separate VPCs for the purpose of routing data traffic as requested. These peer-to-peer communications include a primary communication link and a high availability (HA) communication link. The HA communication link is operational in response to a "failover" condition. More specifically, the communications between a gateway deployed within a VPC and either (i) a gateway of another VPC or (ii) an on-premises computing device such as a router controlling communications within an on-premises network are accomplished by the primary communication link placed in an "active" state. The HA communication link is initially set to a "standby" (inactive) state, but is switched to an "active" state when the primary communication link fails. However, this VPC "failover" communication scheme suffers from a number of disadvantages.

One disadvantage associated with the conventional VPC failover communication scheme is that it requires deployment of complex failover logic within the controller to manage operability of the public cloud network. For example, the failover logic would need to continuously track the current state of the primary communication link and would need to conduct an update of a gateway routing table for the cloud computing network in response to failure of the primary communication link. Additionally, in response to failure of both the primary and HA communication links, the failover logic would need to reprogram the VPC routing table. The VPC routing table is relied upon for determining which gateway is targeted to receive downloaded data while the gateway routing table is relied upon for determining which communication link is used for transmission of the downloaded data. Another disadvantage with the active-standby failover scheme is the inefficient use of resources allocated for the standby communication link. These resources are never used until a failover event happens.

The updating of both of these routing tables is time consuming and disruptive to ongoing communications, especially the reprogramming of the VPC routing table. The convergence (stabilization) of the network and avoidance of disruption of data communications within or to the public cloud is necessary as more companies migrate their networking operations to the cloud.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
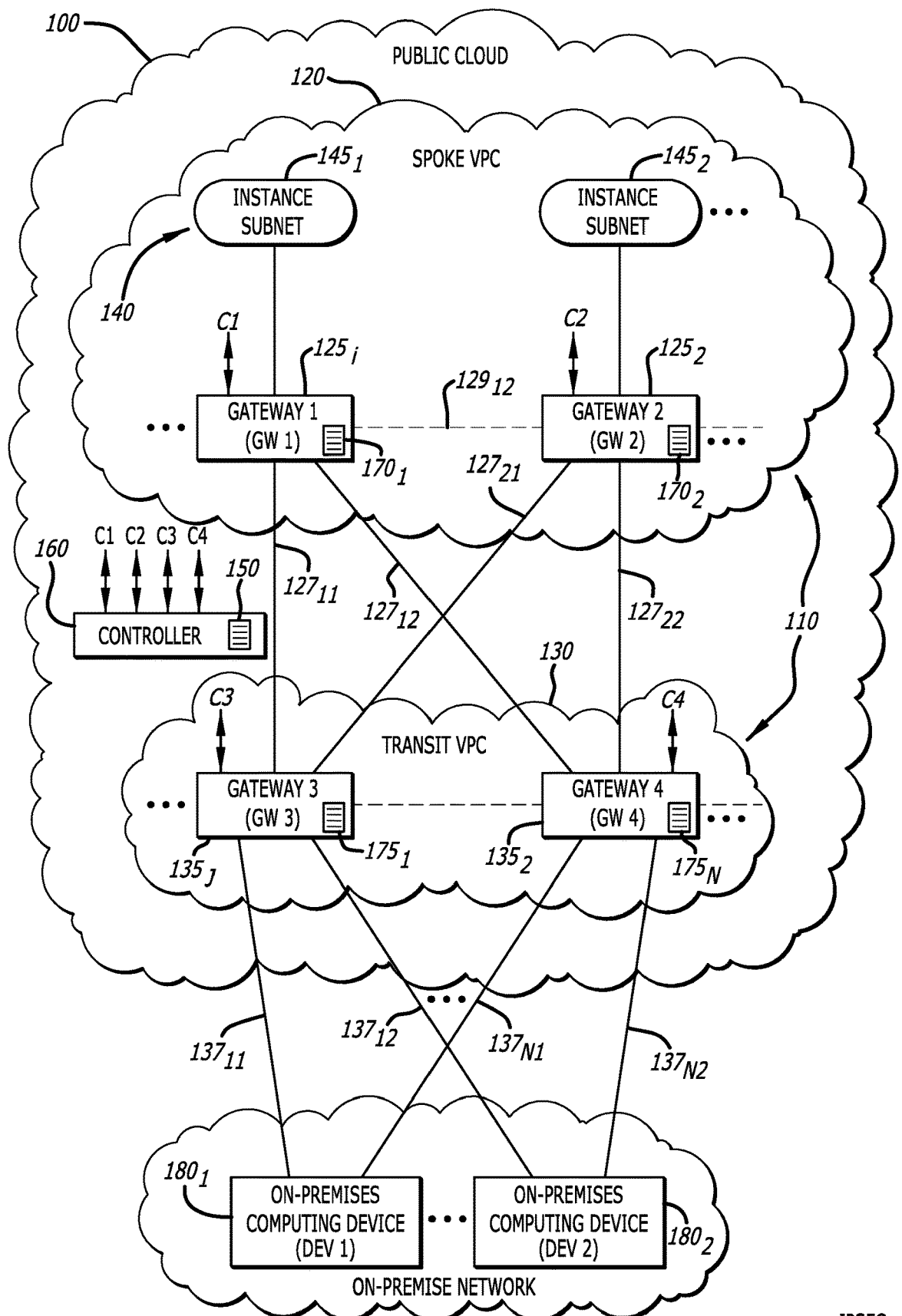
FIG. 1 is a diagram of an exemplary embodiment of a public cloud computing platform implemented as a load-balanced, full-mesh network featuring multiple virtual private cloud networks that collectively support communications between multiple instances within a private cloud network and an on-premises network.

Embodiments of a system and method for establishing a load-balanced, full-mesh network within a public cloud computing platform that mitigates disruption of communications directed to or from virtual private cloud networks (VPCs) due to communication link failures. The full-mesh network may be accomplished by establishing (i) a first cloud-based networking infrastructure operating as a first virtual private cloud network (hereinafter, "spoke VPC") and (ii) a second cloud-based networking infrastructure operating as a second virtual private cloud network (hereinafter, "transit VPC"). The spoke VPC includes a set of (e.g., two or more) gateways (hereinafter, "spoke gateways"), which are communicatively coupled to one or more instances (e.g., cloud instances associated with a particular subnet or particular subnets as described below) and a set of gateways deployed within the transit VPC (hereinafter, "transit gateways"). Each of the spoke gateways and transit gateways may be accessed in accordance with a unique Classless Inter-Domain Routing (CIDR) routing address to propagate messages over the network.

Besides communicatively coupled to the set of spoke gateways, the set of transit gateways may be communicatively coupled to one or more computing devices deployed within an on-premises network (hereinafter, "on-prem computing devices"). Herein, the transit VPC is configured to control the propagation of data traffic between the spoke VPC and the on-premises network while the spoke VPC is configured to control the propagation of data traffic between instances maintained within the spoke VPC and the transit VPC.

According to one embodiment of the disclosure, the first cloud-based networking infrastructure features a one-to-many communication link deployment (e.g., criss-cross peering), where each spoke gateway supports multiple, active peer-to-peer communication links to different transit gateways and each transit gateway supports multiple, active peer-to-peer communication links to different spoke gateways as well as an active peer-to-peer communication link to each on-prem computing device. According to one embodiment of the disclosure, the peer-to-peer communication links may constitute cryptographically secure tunnels, such as tunnels operating in accordance with a secure network protocol. One example of a secure network protocol may include, but is not limited or restricted to Internet Protocol Security (IPSec). Hence, for clarity sake, these peer-to-peer communication links may be referred to as "IPSec tunnels."

Herein, the deployment of full-mesh peering in lieu of primary/HA communication links utilized in conventional cloud computing platforms provides a number of technological advantages. For example, the full-mesh peering architecture is configured to avoid intensive monitoring of routing tables relied upon by a gateway (referred to as a "gateway routing table") for determining which IPSec tunnel is used in the transmission of data, especially for a tunnel state change. To achieve load-balancing, all of the IPSec tunnels directed to the transit gateways are set to identical, equal cost multi-path (ECMP) routing parameters, namely identical routing weights and ECMP metrics as described below. Alternatively, according to another embodiment of the disclosure, loading balancing is not based on ECMP; rather, load balancing is achieved through an assignment of weights such that different tunnels may be assigned with different weights, based on one or a combination of factors such as bandwidth, preference, or the like.

Herein, when an IPSec tunnel fails, the gateway updates its gateway routing table autonomously by disabling (bring down) a tunnel interface (e.g., virtual tunnel interface) corresponding to the failed IPSec tunnel without reliance on activity by a controller that manages operability of the full-mesh network. As a result, the gateway precludes messages from being routed through the failed IPSec tunnel to mitigate data transmission loss. Instead, the messages are routed through a selected active IPSec tunnel, which may be reassigned to communication with all or some of the instances within a particular instance subnet. In response to the IPSec tunnel becoming operational (i.e., the IPSec tunnel goes up), the gateway will bring up the corresponding tunnel interface and recover the routing path if removed from the gateway routing table (e.g., routing path removed when all of the IPSec tunnels to a particular destination becoming disabled).

Additionally, the full-mesh network provides another technological advantage by avoiding time intensive reprogramming of a virtual private cloud (VPC) routing table relied upon for determining a routing path between an identified source and destination. This may be accomplished by establishing one or more secondary tunnels for each routing path, where the secondary tunnel provides an alternative routing path via a gateway residing within the same VPC (e.g., gateways within the spoke VPC, gateways within the transit VPC, etc.). Each secondary tunnel supports the transmission of data through the alternative routing path when all of the IPSEC tunnels from a particular gateway have failed. Hence, secondary tunnels enable another gateway to operate as an intermediary device to support continued communications from the particular gateway with a remote peer destination (e.g., cloud instance, on-prem computing device, etc.). Each of the secondary tunnels may be configured in accordance with Generic Routing Encapsulation (GRE) tunnel protocol to secure communications between gateways within the same VPC. However, it is contemplated that another tunneling protocol, such as any IP routable tunnel based on Private IP addressing, inclusive of IPSec, may be used other than GRE.

Routing path selection via the gateways within the VPCs may be accomplished through an equal cost multi-path (ECMP) routing strategy, namely next-hop message forwarding to a single destination can occur over multiple "best" paths that are determined in accordance with an assigned ECMP metric. Hence, the IPSec tunnels associated with a gateway (e.g., spoke gateway or transit gateway) are assigned equivalent ECMP metrics that are lower than the ECMP metrics assigned to any of the secondary (GRE) tunnels.

Besides the network architecture per se, the operability (method) performed by the system for establishing the load-balanced, full-mesh network to mitigate disruption of communications directed to or from the VPCs is described. Herein, a controller managing operability of the public cloud network configures one or more spoke VPCs by segregating cloud instances within each spoke VPC to particular subnets. A "subnet" is a segment of a VPC's IP address range designated to group resources (e.g., managed software instances each directed to particular functionality) based on security and operational needs. Hence, each instance subnet established within a spoke VPC may be a collection of instances for that spoke VPC that are selected to communicate with a selected spoke gateway residing in the spoke VPC.

Thereafter, the controller collects VPC information (e.g., VPC subnet allocations, VPC routing tables and their association with subnets) and configures a VPC routing table associated with each spoke gateway to establish communication links (e.g., logical connections) between a certain spoke gateway and cloud instances associated with a particular instance subnet. The VPC routing table is programmed to support communication links between different sources and destinations, such as an on-prem computing devices, a cloud instance within a particular instance subnet or the like.

Besides the VPC routing tables for each of the spoke gateways, the controller may be adapted to configure gateway routing tables each of the gateways within the VPCs of the full-mesh network. More specifically, according to one embodiment of the disclosure, the controller may be configured to initially program gateway routing tables for both spoke gateways residing within the spoke VPC(s) and transit gateways residing within the transit VPC(s). The gateway routing tables are relied upon by the gateways for determining which tunnels to use for propagating data traffic (e.g., messages) towards a destination (e.g., virtual tunnel interface for a destination cloud instance or computing device). For this embodiment of the disclosure, the gateway routing tables includes both IPSec tunnels and secondary (e.g., GRE) tunnels between gateways within the same VPC to be used in the event that all of the IPSec tunnels have failed.

The gateway routing tables are accessible to their corresponding gateways, and are updated by these gateways. For example, in response to a failed IPSec tunnel (e.g., change in tunnel state), the gateway associated with the failed IPSec tunnel disables its virtual tunnel interface (VTI). By disabling the VTI associated with the failed IPSec tunnel, further data transmissions over the failed IPSec tunnel is prevented. The disabling of the VTI may be conducted by a gateway (e.g., spoke gateway or transit gateway) without further operability by the controller.

Logic within the gateway detects reversion in the tunnel state (e.g., IPSec tunnel is now active) and, if so, the gateway re-activates the tunnel interface (e.g., remove "disabled" tag and/or resets "active" tag) or recovers the routing path associated with the previously failed IPSec tunnel if removed from the gateway routing table. This recovery of the routing path may be accomplished by accessing a data store (e.g., database) associated with the gateway that maintains routing paths available to that gateway, even failed (disabled) IPSec tunnels.

Based on the foregoing, the reduction in VPC routing table programming is made available through the configuration of the secondary (e.g., GRE) tunnels. End to end load balance is achieved through the network architecture by using of two technics at different stages. Firstly, from VPC instances to spoke gateway, each VPC instance is under a routing subnet. The subnet is associated with a routing table. The routing table route forward data traffic from the instance to a spoke gateway. Traffic from difference source instances of different subnet (routing table) are sent to different spoke gateways, instead of all source instances sending traffic to one spoke gateway in active-standby scheme. Secondly, between spoke gateway and transit gateway, or transit gateway to on-premises routers, this may be based on analytics conducted on a 5-tuple of a message (e.g., source IP address; source port; destination IP address; destination port; destination protocol), which is routed from between the spoke gateway and transit gateway or between the transit gateway and on-premises routes. The analytics may be a one-way hash operation in which the results (or a portion of the results) are used to select a particular ECMP link in the routing table to transmit of the data traffic.

Further details of the logic associated with one embodiment of the load-balanced, full-mesh network system architecture are described below:

Instance Subnets: Multiple instance subnets may be generated in a spoke VPC so that instances forming a particular instance subnet are forwarded to a selected spoke gateway.

VPC routing table(s): A VPC routing table may be used to associate spoke gateways within each VPC with one or more different instance subnets. Load balancing is achieved by implementing the full-mesh network system, where identical, equal cost multi-path (ECMP) routing parameters are assigned to each of the gateways and a secondary tunnel is established between each peer gateway pair within the same VPC. Therefore, the VPC routable table requires no programming unless the gateway becomes disabled (i.e., goes down), where the VPC routing table may be remapped based on the results of a 5-tuple analytics mapped to the remainder of the active gateways within the VPC.

Gateways: Multiple gateways are deployed in a VPC that control the flow of data traffic from instances of the VPC to one or more remote sites including computing devices that may process data received from the instances. Having similar architectures, the gateways may be identified differently based on their location/operability within a public cloud network platform. The "spoke" gateways are configured to interact with targeted instances while "transit" gateways are configured to further assist in the propagation of data traffic (e.g., one or more messages) directed to a spoke gateway within a spoke VPC or a computing device within an on-premises network.

IPSec tunnels: Secure peer-to-peer communication links established between gateways of neighboring VPCs or between gateways of a VPC and a router of an on-premises network. The peer-to-peer communication links are secured through a secure network protocol suite referred to as "Internet Protocol Security" (IPSec). With respect to the full-mesh network deployment, as an illustrative example, where a spoke VPC has "M" gateways and a neighboring (transit) VPC has N gateways, M x N IPSec tunnels are created between the spoke VPC and the transit VPC to form the full-mesh network. These IPSec tunnels are represented in gateways by virtual tunnel interface (VTI) and the tunnel states are represented by VTI states.

Gateway routing: In gateway routing table, routing paths between the gateway and an IP addressable destination to which the tunnel terminates (e.g., another gateway, on-prem computing device, etc.), identified by a virtual tunnel interface (VTI) for example, are programmed with ECMP routing parameters, namely identical routing weights and ECMP metrics. Given consistent ECMP metrics are assigned to the IPSec tunnels, the selected routing path towards the remote network may be based on analytics conducted on certain information associated with data traffic (e.g., 5-tuple). These analytics may include conducting a one-way hash operation on the 5-tuple information where a portion of the hash value may be used to identify the selected IPSec tunnel. If any of the IPSec tunnels state is changed or disabled (or reactivated), the corresponding VTI may be removed (or added) from consideration as to termination points for the selected routing path.

Secondary tunnels: Each of the gateways in the same VPC may be configured to create secondary (backup) communication links (e.g., GRE tunnels) towards all other gateways within that VPC, also represented by VTIs. For example, with respect to a VPC including M gateways, each gateway will have M-1 secondary communication links. Herein, these secondary communication links are assigned with higher metric values within the gateway routing table than communication links (e.g., IPSec tunnels) pointing to a remote peer gateway. Therefore, according to one embodiment of the disclosure, a secondary communication link (e.g., GRE tunnel) will not forward traffic until all of the IPSec tunnels for that particular gateway have become disabled (gone down).

I. TERMINOLOGY

In the following description, certain terminology is used to describe features of the invention. In certain situations, the terms "logic" and "computing device" is representative of hardware, software or a combination thereof, which is configured to perform one or more functions. As hardware, the logic (or device) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or computing device) may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As software, the logic may operate as firmware stored in persistent storage.

The term "computerized" generally represents that any corresponding operations are conducted by hardware in combination with software.

The term "gateway" may be construed as a virtual or physical logic. For instance, as an illustrative example, the gateway may correspond to virtual logic in the form of a software component, such as a virtual machine (VM)-based data routing component that is assigned a Private IP address within an IP address range associated with a VPC including the gateway. The gateway allows Cloud Service Providers (CSPs) and enterprises to enable datacenter and cloud network traffic routing between virtual and physical networks, including a public network (e.g., Internet). Alternatively, in some embodiments, the gateway may correspond to physical logic, such as an electronic device that is communicatively coupled to the network and assigned the hardware (MAC) address and IP address.

The term "cloud-based networking infrastructure" generally refers to a combination of software instances generated based on execution of certain software by hardware associated with the public cloud network. Each software instance may constitute a virtual network resource associated with the public cloud network, such as a switch, server or the like.

The term "message" generally refers to information in a prescribed format and transmitted in accordance with a suitable delivery protocol. Hence, each message may be in the form of one or more packets, frames, or any other series of bits having the prescribed format.

The term "transmission medium" may be construed as a physical or logical communication path between two or more electronic devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. GENERAL SYSTEM ARCHITECTURE

Figure 4:
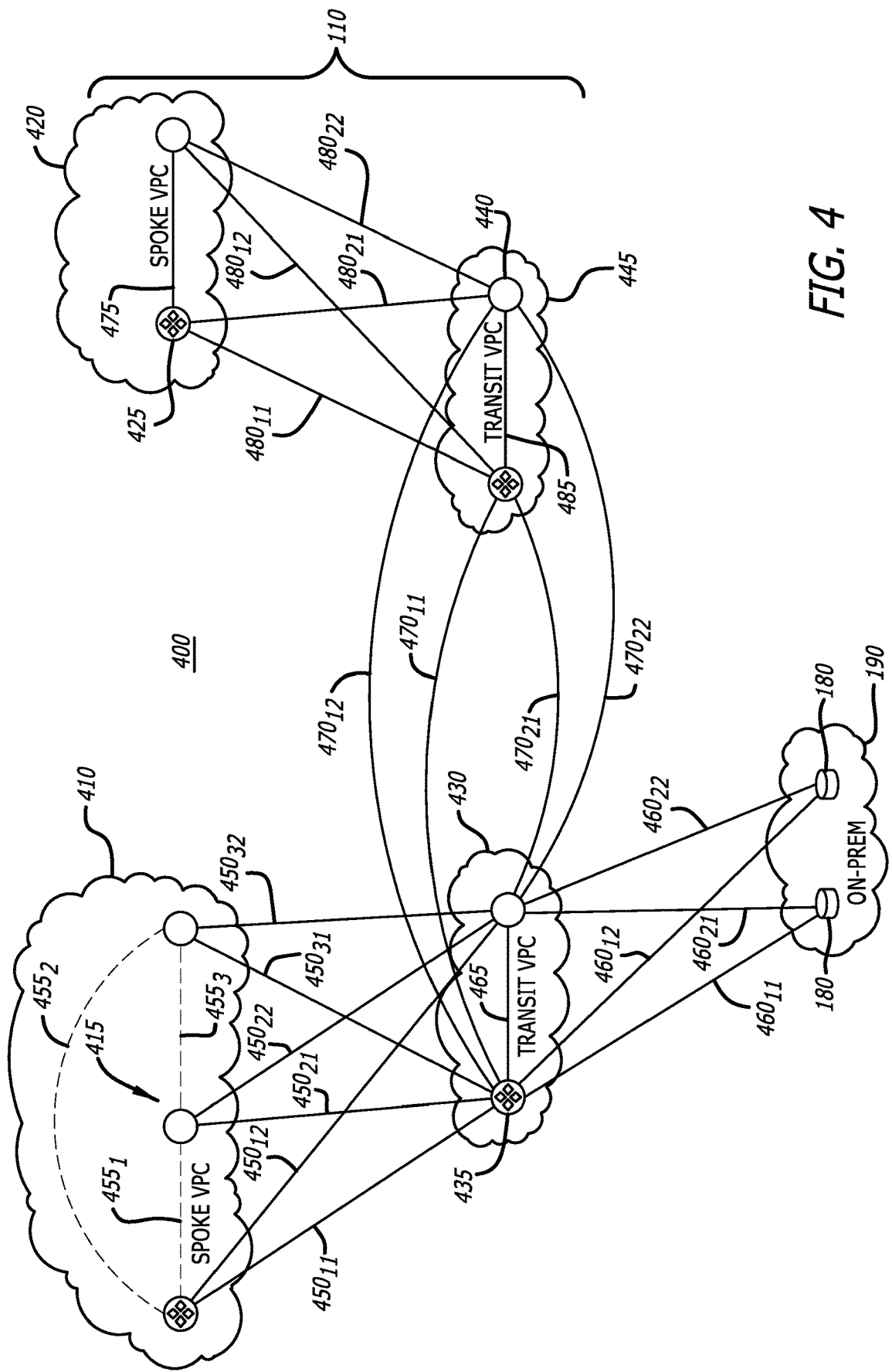
FIG. 4 is a second exemplary embodiment of a public cloud computing platform, including the full-mesh network 110 configured to mitigate the disruption of communications between four (4) virtual private cloud networks.

Referring to FIG. 1, a first exemplary embodiment of a public cloud computing platform 100 implemented with a load-balanced, full-mesh network 110, which supports reliable communications between one or more instances of a virtual private cloud network (VPC) and one or more computing devices 180 deployed within an on-premises network 190, is shown. According to this embodiment of the disclosure, the full-mesh network 110 is configured to mitigate the disruption of communications between at least a first virtual private cloud network (hereinafter, "spoke VPC") 120 and a second virtual public cloud network (hereinafter, "transit VPC") 130 within the public cloud computing platform 100 due to communication link failures. Although two VPCs 120 and 130 are illustrated in FIG. 1 for clarity sake, it is contemplated that multiple "spoke" VPCs and multiple "transit" VPCs may formulate the construct of the full-mesh network 110 as shown in FIG. 4.

As shown, the spoke VPC 120 is configured with multiple VPC subnetworks 145 (hereinafter, "subnets"), where each of these subnets 145 includes different cloud instances. Each of the instance subnets $145_1, \ldots,$ or $145_P$ (P≥2) is configured, in accordance with a VPC routing table 150, to exchange data traffic with a selected gateway of a set of (e.g., two or more) gateways $125_1$-$125_M$ (M≥2) maintained in the spoke VPC 120. Herein, these gateways $125_1$-$125_M$ are referred to as "spoke gateways" $125_1$-$125_M$. More specifically, a controller 160 for the full-mesh network 110 is configured to manage communication links between the instance subnets $145_1$-$145_P$ and the set of spoke gateways $125_1$-$125_M$ as represented by the VPC routing table 150, which is initially programmed to identify which spoke gateway $125_1 \ldots$ or $125_M$ is responsible for interacting with one or more instance subnets $145_1 \ldots$, or $145_P$ (e.g., to receive message(s), forward message(s), etc.).

Referring still to FIG. 1, according to one embodiment of the disclosure, the full-mesh network 110 may be accomplished by peering the set of spoke gateways $125_1$-$125_M$ deployed within the spoke VPC 120 to a set of gateways $135_1$-$135_N$ deployed within the transit VPC 130, which may be referred to as "transit gateways" $135_1$-$135_N$ (N≥2). As ease of illustration, the set of spoke gateways $125_1$-$125_M$ is represented as a first spoke gateway $125_1$ and a second spoke gateway $125_2$, although three or more spoke gateways may be deployed within the spoke VPC 120. Similarly, the set of transit gateways $135_1$-$135_N$ is represented by a first transit gateway $135_1$ and a second transit gateway $135_2$, although three or more transit gateways may be deployed within the transit VPC 130.

The spoke gateways $125_1$-$125_M$ are configured for communications with transit gateways $135_1$-$135_N$ via peer-to-peer communication links $127_{11}$-$127_{MN}$. In particular, each spoke gateway $125_i$ (1≤i≤M) is communicatively coupled to each of the transit gateways $135_1$-$135_N$ via multiple, active peer-to-peer communication links $127_{i1}$-$127_{iN}$. Similarly, each transit gateway $135_j$ (1≤j≤N) is communicatively coupled to each of the spoke gateways $125_1$-$125_M$ via multiple, active peer-to-peer communication links $127_{1j}$-$127_{Mj}$. The peer-to-peer communication links $127_{11}$-$127_{MN}$ may constitute cryptographically secure tunnels, such as tunnels operating in accordance with a secure network protocol. One example of a secure network protocol may include, but is not limited or restricted to Internet Protocol Security (IPSec). Hence, the VPC-to-VPC tunnels may be referred to as "IPSec tunnels."

In general terms, for the full-mesh network 110 that features the spoke VPC 120 including "M" spoke gateways and the neighboring transit VPC 130 including "N" transit gateways, M x N IPSec tunnels $127_{11}$-$127_{MN}$ are created between the spoke VPC 120 and the transit VPC 130. The IPSec tunnels $127_{11}$-$127_{MN}$ may be established and maintained through gateway routing tables $170_1$-$170_M$ dedicated to each of the spoke gateways $125_1$-$125_M$, respectively. For example, a first gateway routing table $170_1$ determines which IPSec tunnel $127_{11}$-$127_{1N}$ for use in forwarding a message from one of the cloud instances 140 assigned to the first gateway $125_1$ to a destination instance (not shown) reachable via one of the on-prem computing device(s) 180.

As an illustrative example, as shown specifically in FIG. 1, the first spoke gateway $125_1$ is communicatively coupled to both the first transit gateway $135_1$ via IPSec tunnel $127_{11}$ and the second transit gateway $135_2$ via IPSec tunnel $127_{12}$. Similarly, the second spoke gateway $125_2$ is communicatively coupled to both the first transit gateway $135_1$ via IPSec tunnel $127_{21}$ and the second transit gateway $135_2$ via IPSec tunnel $127_{22}$. For this architecture, each spoke gateway $125_1$ and $125_2$ is communicatively coupled to each of the transit gateways $135_1$ and $135_2$ via multiple, active peer-to-peer communication links $127_{11}$, $127_{12}$, $127_{21}$ and $127_{22}$. The management of the IPSec tunnels $127_{11}$-$127_{12}$ and $127_{21}$-$127_{22}$ may be accomplished through gateway routing tables $170_1$-$170_2$ and $175_1$-$175_2$ maintained by each of the respective gateways $125_1$-$125_2$ and $135_1$-$135_2$, as described below.

Figure 2A:
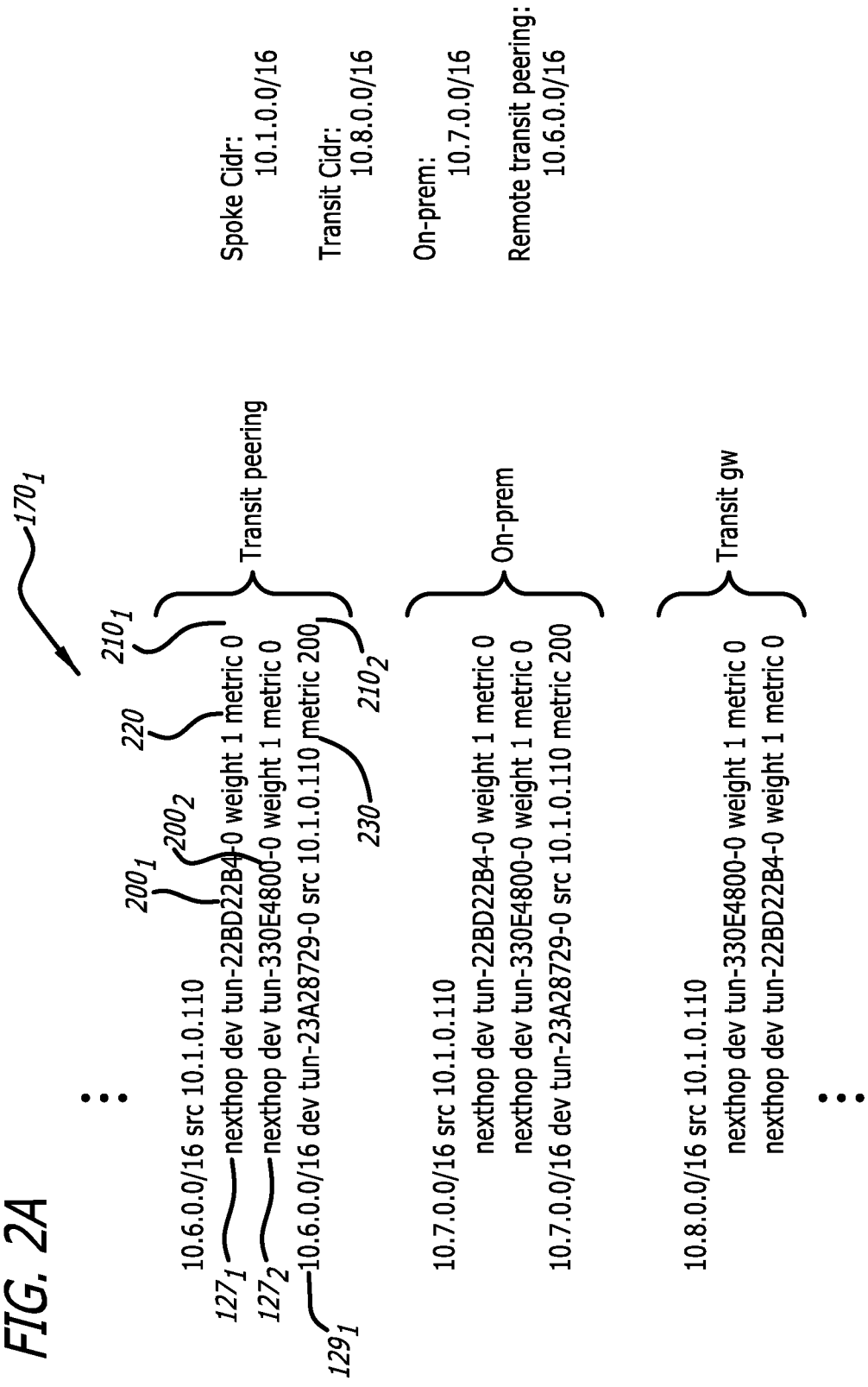
FIGS. 2A-2B are exemplary embodiments of a gateway routing table programmed to represent IPSec tunnel supported by a gateway of a first virtual private cloud network of the load-balanced, full-mesh network.
Figure 2B:
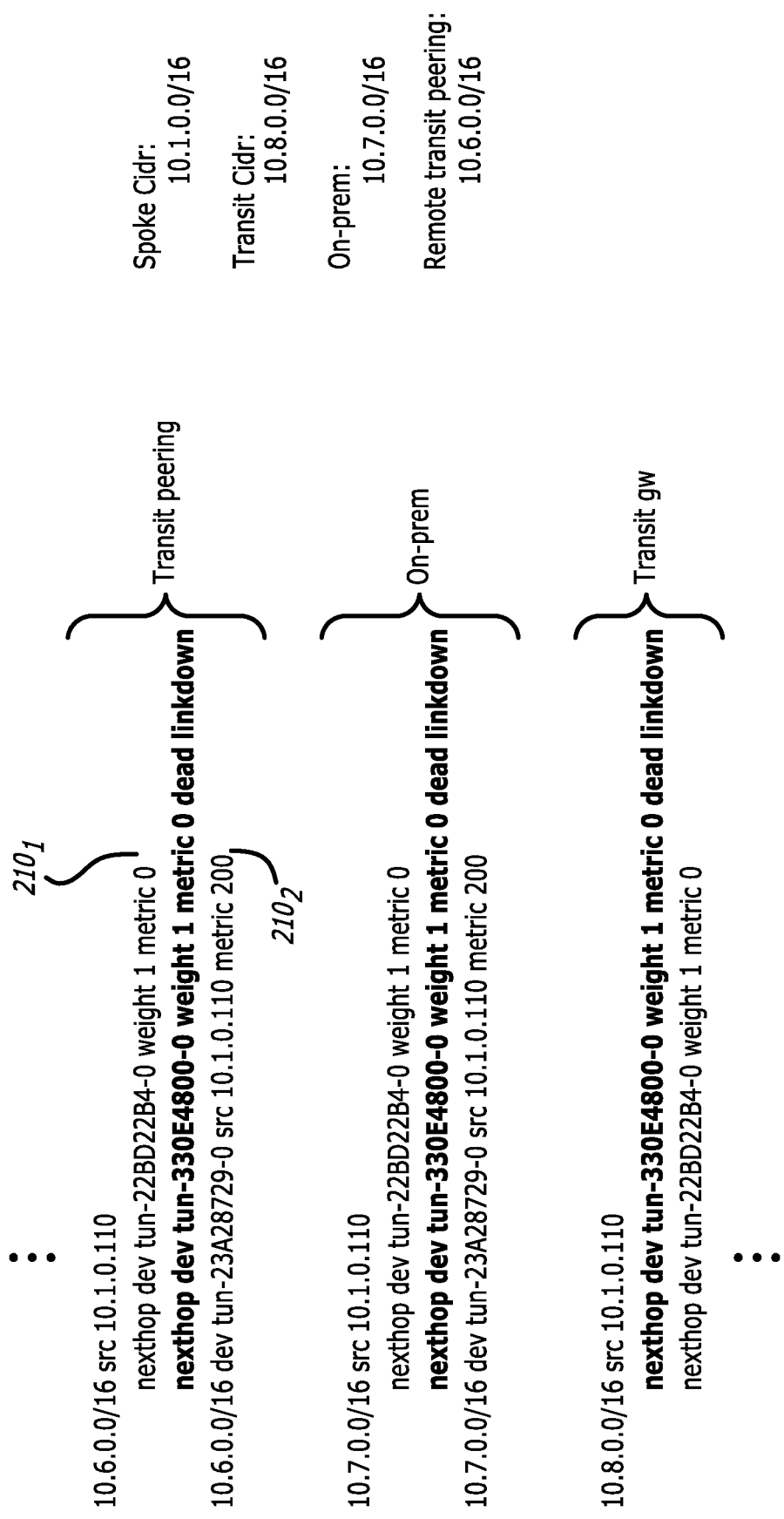

Referring now to FIGS. 2A-2B, an exemplary embodiment of a portion of the first spoke gateway routing table $170_1$ programmed to represent IPSec tunnels $127_{11}$-$127_{12}$ supported by the first spoke gateway $170_1$ of the spoke VPC 120 is shown. Herein, each IPSec tunnel $127_{11}$ or $127_{12}$ may be represented by a corresponding virtual tunnel interface (VTI) $200_1$ or $200_2$ and a state of each IPSec tunnel $127_{11}$ or $127_{12}$ may be represented by a corresponding virtual tunnel interface (VTI) state $210_1$ or $210_2$, respectively. No identification of link status (e.g., "linkdown") identifies that the link is active. Selection of the IPSec tunnel $127_{11}$-$127_{12}$ to support communications from the first spoke gateway $125_1$ toward the on-premises network 190 may be accomplished through ECMP routing. As a result, each IPSec tunnel $127_{11}$-$127_{12}$, selected to support message transmissions from the first spoke gateway $120_1$, is assigned an equal ECMP metric (metric=0) 220, which is less than the ECMP metric 230 (metric=200) assigned to the secondary (GRE) tunnels (e.g., GRE tunnel $129_1$). It is contemplated that, while the IPSec tunnels $127_{11}$-$127_{12}$ may be assigned identical ECMP metrics (metric=0) for load balancing, the GRE tunnel(s) may be assigned different ECMP metrics to prioritize the GRE tunnels from the first spoke gateway $120_1$ upon failure of IPSec tunnel $127_{11}$-$127_{12}$ shown in FIG. 1.

Referring back to FIG. 1, each transit gateway $135_j$ (1<j<N) supports multiple active peer-to-peer communication links with each of the on-prem computing device(s) 180 (e.g., on-prem computing devices $180_1$ and $180_2$). Hence, where the transit VPC 130 includes "N" transit gateways in communications with a plurality of on-prem computing devices $180_1$ and $180_2$, N x 2 IPSec tunnels $137_{11}$-$137_{12} \ldots$ and $137_{N1}$-$137_{N2}$ are created between the transit VPC 130 and the on-premises network 190. Similarly, the IPSec tunnels $137_{11}$-$137_{N2}$ may be established and maintained through transit gateway routing tables $175_1$-$175_N$ dedicated to each of the transit gateways $135_1$-$135_N$, respectively.

Figure 2C:
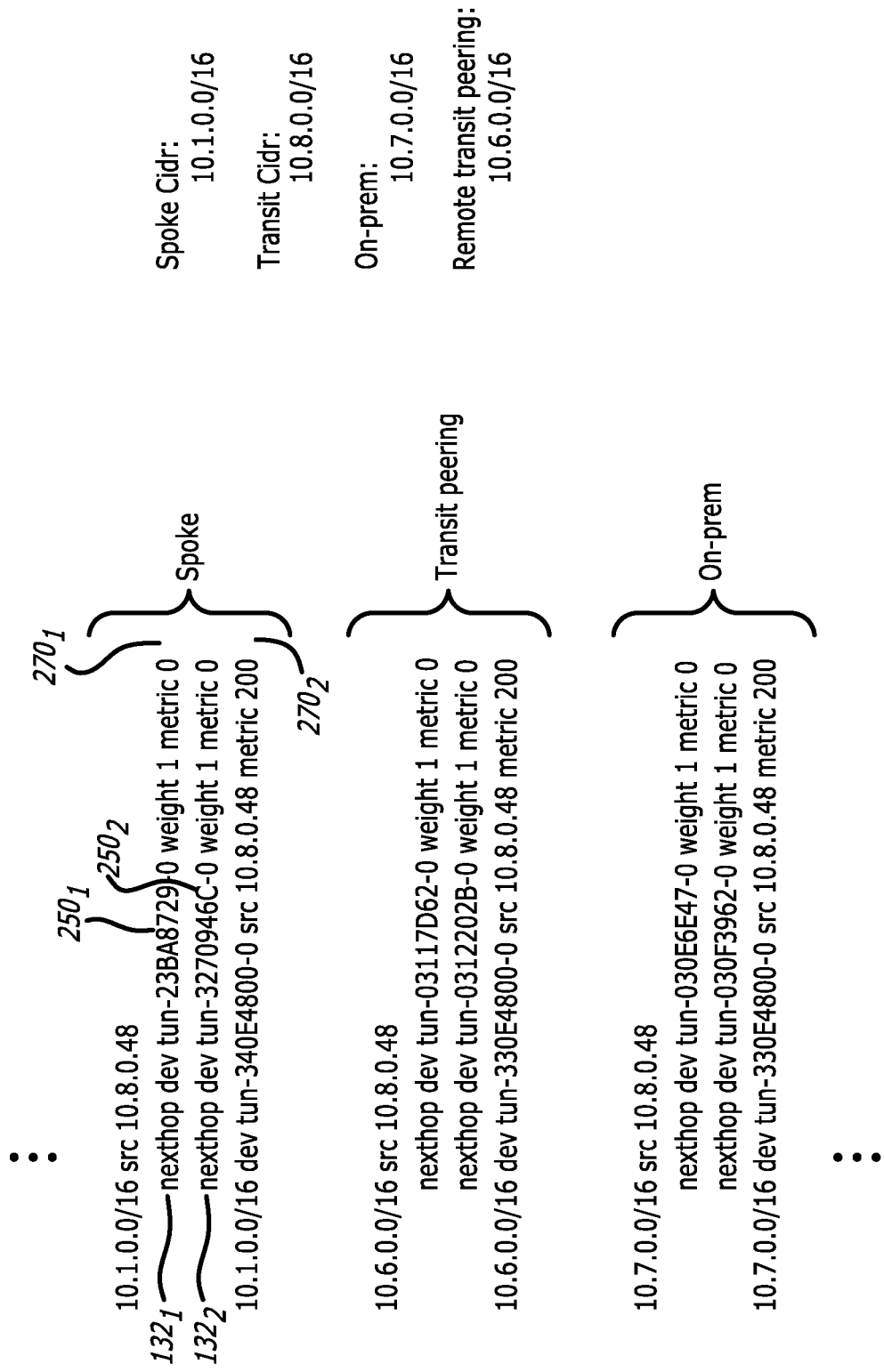
FIGS. 2C-2D are exemplary embodiments of a transit gateway routing table programmed to represent IPSec tunnel supported by a transit gateway of a second virtual private cloud network of the load-balanced, full-mesh network.
Figure 2D:
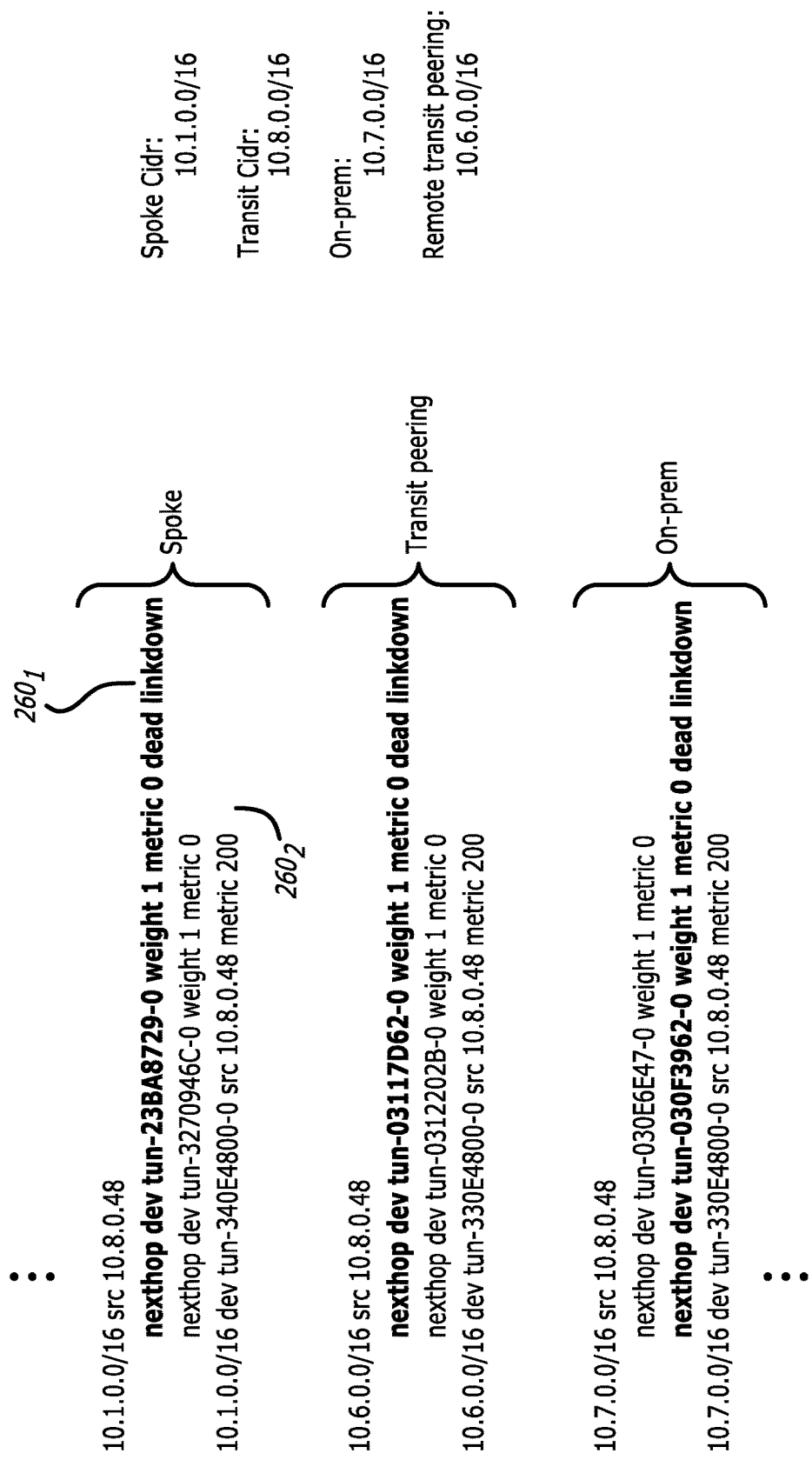

As an illustrative example, a first transit gateway routing table $175_1$ determines which IPSec tunnel $137_{11}$-$137_{12}$ for use in forwarding a message received from the spoke VPC 120 and directed to the destination instance reachable via one of the on-prem computing devices $180_1$ and $180_2$. As shown in FIGS. 2C-2D, the first transit gateway routing table $175_1$ may be programmed to represent each IPSec tunnel $137_{11}$-$137_{12}$ by a corresponding virtual tunnel interface (VTI) $250_1$-$250_2$ and a state of each of the IPSec tunnel $137_{11}$-$137_{12}$ may be represented by a corresponding virtual tunnel interface (VTI) state $260_1$-$260_2$. The VTI state $260_1$-$260_2$ and with the ECMP metrics $270_1$-$270_2$ are used to control selection in the use of IPSec tunnels $137_{11}$-$137_{12}$ given whether these IPSec tunnels $137_{11}$-$137_{12}$ are active or disabled.

Additionally, the full-mesh network 110 provides another technological advantage by establishing more reliable communications by configuring each of the gateways $125_1$-$125_M$ and $135_1$-$135_N$ with secondary tunnels to support data traffic when all IPSEC tunnels for a particular gateway have failed. As an illustrative example, as shown in FIG. 1, the first spoke gateway $125_1$ deployed within the spoke VPC 120 establishes a secondary tunnel $129_1$ with the second spoke gateway $125_2$. According to one embodiment of the disclosure, each of the secondary tunnels (e.g., secondary tunnel $129_1$) may be configured in accordance with Generic Routing Encapsulation (GRE) tunnel protocol to secure communications between the spoke gateways $125_1$-$125_2$ within the spoke VPC 120 and the transit gateways $135_1$-$135_2$ within the transit VPC 130. However, it is contemplated that another tunneling protocol, such as any IP routable tunnel reliance on Private IP addressing) may be used other than GRE.

Herein, the GRE tunnel formation among the spoke gateways $125_1$-$125_M$ (M≥2) within the spoke VPC 120 is described in detail, give the GRE tunnel formation for the transit gateways $135_1$-$135_N$ within the transit VPC 130 is consistent. In general, the spoke gateways $125_1$-$125_M$ are configured with GRE tunnels towards all other gateways in the spoke VPC 120, where the GRE tunnels may be maintained within the gateway routing tables $170_1$-$170_M$ and terminated by VTIs associated with the corresponding gateways. For this embodiment, for the spoke VPC 120, the first spoke gateway $125_1$ would be configured with "M−1" backup GRE tunnels such as GRE tunnel $129_{12}$ established between the first spoke gateway $125_1$ and the second spoke gateway $125_2$. Similarly, "M−2" GRE tunnels may be established between the second spoke gateway $125_2$ and any of the remaining gateways $125_3$-$125_M$ within the spoke VPC 120. As shown, the first spoke gateway $125_1$ is configured with GRE tunnel $129_{12}$, which establishes secondary communications with the second spoke gateway $125_2$.

The GRE tunnels may be programmed with different ECMP metrics to designate an order of selection in case any GRE tunnels fail due to failure of the assigned gateway itself. Also, the ECMP metrics associated with the GRE tunnels are set with a higher ECMP metric than ECMP metrics associated with any of the IPSec tunnels so that the GRE routing is selected if routing via any IPSec tunnel is not available. Hence, as shown, none of the gateways $125_1$-$125_2$ will forward data traffic via the GRE tunnels $129_{12}$ until all IPSEC tunnels towards remote peers are down (disabled).

Referring still to FIG. 1, each of the on-prem computing devices $180_1$ and $180_2$ operates as a network router by propagating data traffic (e.g., one or more messages) originating from one of the cloud instances 140 through multiple VPCs forming the full-mesh network 110. Upon receipt of the message(s), using a local routing table, the targeted on-prem computing device (e.g., device $180_1$) forwards the message(s) to the destination instance(s).

Figure 3:
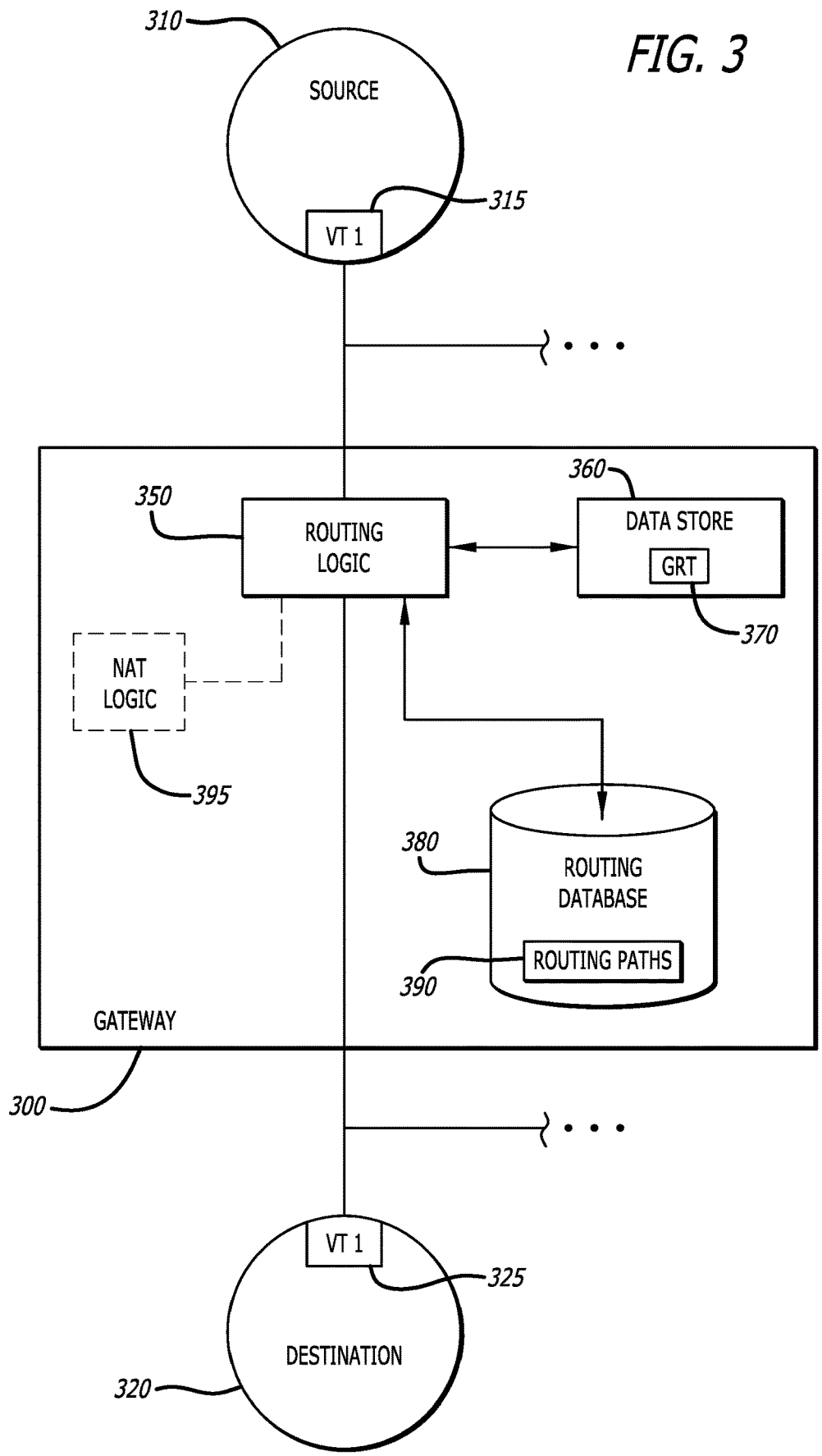
FIG. 3 is an exemplary illustration of a logical representation of a gateway deployed within the virtual private cloud network of FIG. 1.

Referring to FIG. 3, an exemplary illustration of a logical representation of a gateway 300 (e.g., first spoke gateway $125_1$) deployed in a virtual private cloud network of FIG. 1 is shown. In one embodiment, the gateway 300 may correspond to logic that provides a logical connection between a source 310 and a destination 320. For example, the source 310 may correspond to a user (on-prem computing device), resource within a VPC (e.g., cloud instance), or another gateway that supports connectivity with the destination 320, as referenced by a first VTI 315. Herein, in this example, the destination 320 may correspond to a cloud instance (when the source 310 is a user or gateway), a user (when the source 310 is a cloud interface or a gateway), or a gateway (when the source 310 is a user, cloud interface or another gateway), as referenced by a second VTI 325. As represented, the gateway 300 may support logical connections with one or more sources 310 and/or one or more destinations 320.

The gateway 300 may be configured with routing logic 350 and a data store 360. As shown in FIG. 3, the data store 360 may include a gateway routing table 370 (e.g., gateway routing table $170_1$ where the gateway 300 corresponds to the first spoke gateway $125_i$) and a route database 380. The gateway routing table 370 is referenced by the routing logic 350 in determining which communication link is used for transmission of the data received from the source 310 for routing towards the destination 320. The routing database 380 is configured to retain routing paths 390 for retrieval when a disabled routing path is removed from the gateway routing table 370.

As an optional component, the gateway 300 may include NAT logic 395 which, when executed, is configured to perform translation of the IP addresses for data packets transmitted between the spoke VPC 120 and the transit VPC 130. For example, in the Internet gateway 300, the NAT logic 395 may create a destination NAT entry to translate a private IP address associated with the source 310 residing within the spoke VPC 120 to a private IP address utilized by the transit VPC 130 in which the destination 320 is located. Similarly, an inverse translation is conducted where the private IP address associated with the transit VPC 130 may be returned back into the private IP address associated with the spoke VPC 120.

Referring now to FIG. 4, a second exemplary embodiment of a public cloud computing platform 400, including the full-mesh network 110 configured to mitigate the disruption of communications between a plurality of VPCs 410, 420, 430 and 440, is shown. The first VPC 410 includes a first set of spoke gateways 415 while the second VPC 420 includes a second set of spoke gateways 420. Additionally, the third VPC 430 includes a first set of transit gateways 435 and the fourth VPC 440 includes a second set of transit gateways 445.

Similar to architecture of the public cloud computing platform 100 described in FIG. 1, each spoke gateway of the first set spoke gateways 415 is communicatively coupled to each transit gateway of the first set of transit gateways 435 through IPSec tunnels $450_{11}$, $450_{12}$, $450_{21}$, $450_{22}$, $450_{31}$ and $450_{32}$ in a crisscross scheme. Additionally, each of the spoke gateways 415 is communicatively coupled together via GRE tunnels $455_1$-$455_3$.

As further shown in FIG. 4, each transit gateway of the first set of transit gateways 435 is communicatively coupled to each spoke gateway of the first set of spoke gateways 415 through IPSec tunnels $450_{11}$-$450_{32}$ as described above. Additionally, each of the first set of transit gateways 435 deployed within the third VPC 430 is communicatively coupled to (i) the on-prem computing devices 180 within the on-premises network 190 (e.g., on-prem computing devices $180_1$ and $180_2$) via IPSec tunnels $460_{11}$, $460_{12}$, $460_{21}$ and $460_{22}$ and (ii) each transit gateway of the second set of transit gateways 445 deployed within the fourth VPC 440 via IPSec tunnels $470_{11}$, $470_{12}$, $470_{21}$ and $470_{22}$. The second set of transit gateways 445 is communicatively coupled to the second set of spoke gateways 425 via IPSec tunnels $480_{11}$, $480_{12}$, $480_{21}$ and $480_{22}$.

The communications between the second VPC 420 and the fourth VPC 440 provide a reliable communication scheme among multiple VPCs featuring spoke gateways that enable a user to access cloud instances with the first VPC 410 via the first set of spoke gateways 415 and the second VPC 420 via the second set of spoke gateways 425. Also, when multiple VPCs are deployed and support inter-communications, this spoke-hub architect has advantage over full meshed direct peering between VPCs—it is more cost effective (e.g., less peering connections needed; lower requirement for VPC gateway resources, etc.), easier manageability, and the like.

As further shown in FIG. 4, each of the gateways with the VPCs is communicatively coupled together via GRE tunnels to avoid VPC routing table reprogramming upon failure of IPSec tunnels associated with a particular gateway. In particular, each of the first set of spoke gateways 415 is communicatively coupled together via GRE tunnels $455_1$-$455_3$. Similarly, each of the first set of transit gateways 435 is communicatively coupled together via GRE tunnel 465 while each of the second set of spoke gateways 435 and the second set of transit gateways 445 is communicatively coupled together via GRE tunnel 475 and GRE tunnels 485, respectively.

III. OPERATIONAL FLOW

Figure 5:
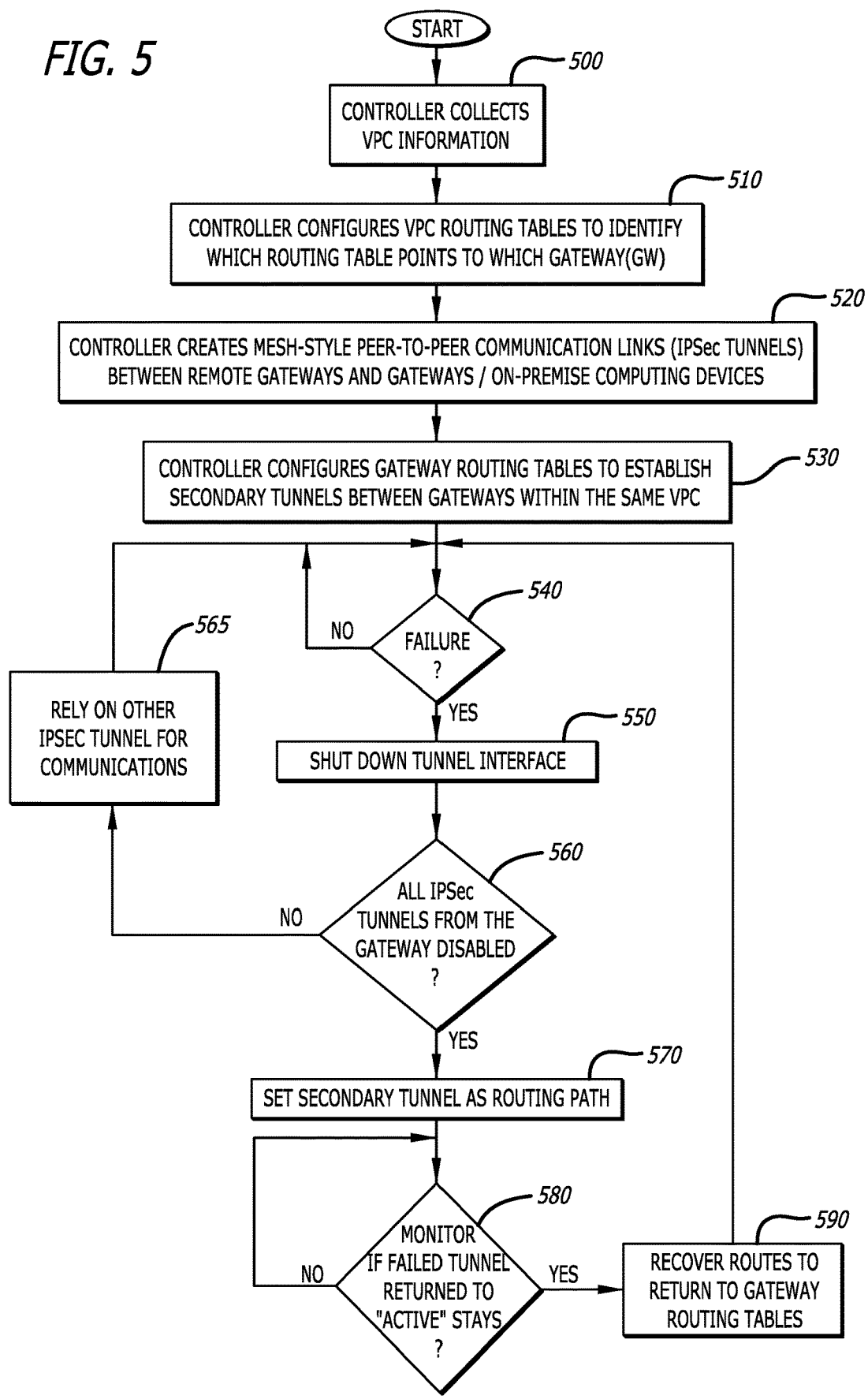
FIG. 5 is a flowchart of an exemplary embodiment of the operability of the public cloud computing platform of FIG. 1 in supporting communications between multiple virtual private cloud networks without reliance of changes to the VPC routing table.

Referring now to FIG. 5, a flowchart of an exemplary embodiment of the operability of the public cloud computing platform of FIG. 1 in supporting communications between multiple virtual private cloud networks (VPCs) that are designed to mitigate the necessity of reprogramming VPC routing table(s) based on communication link failures experienced by gateways within the VPC. Herein, according to one embodiment of the disclosure, the controller collects VPC information as described above (block 500). Thereafter, for the public cloud computing platform illustrated in FIG. 1 for example, the controller configures a first VPC routing table to identify (i) which instance subnet maintained within the first (spoke) VPC corresponds to which gateway and (ii) which gateways of the first VPC are in communication with which gateways of the second (transit) VPC (block 510).

Additionally, the controller may initially configure each of the gateway routing tables to create mesh-style, peer-to-peer communication links between remote gateways such as spoke-transit gateways implemented on different VPCs (e.g., IPSec tunnels) as well as communications between transit gateways and computing devices (e.g., routers) of the on-premises network (block 520). For load balancing, each of the communication links, represented as routing paths, may be configured with multi-path (ECMP) routing parameters (e.g., identical routing weights and ECMP metrics) to ensure that sources may rely on the routing paths equally. Additionally, these gateway routing tables may include peer-to-peer communications (secondary tunnels) between spoke gateways or transit gateways within the same VPC (block 530). As a result, the VPC routing table and gateway routing tables specific to each gateway are generated, where the gateway routing tables are now responsible for alternating its gateway routing table to address state channels within the IPSec tunnels and GRE tunnels.

Figure 6A:
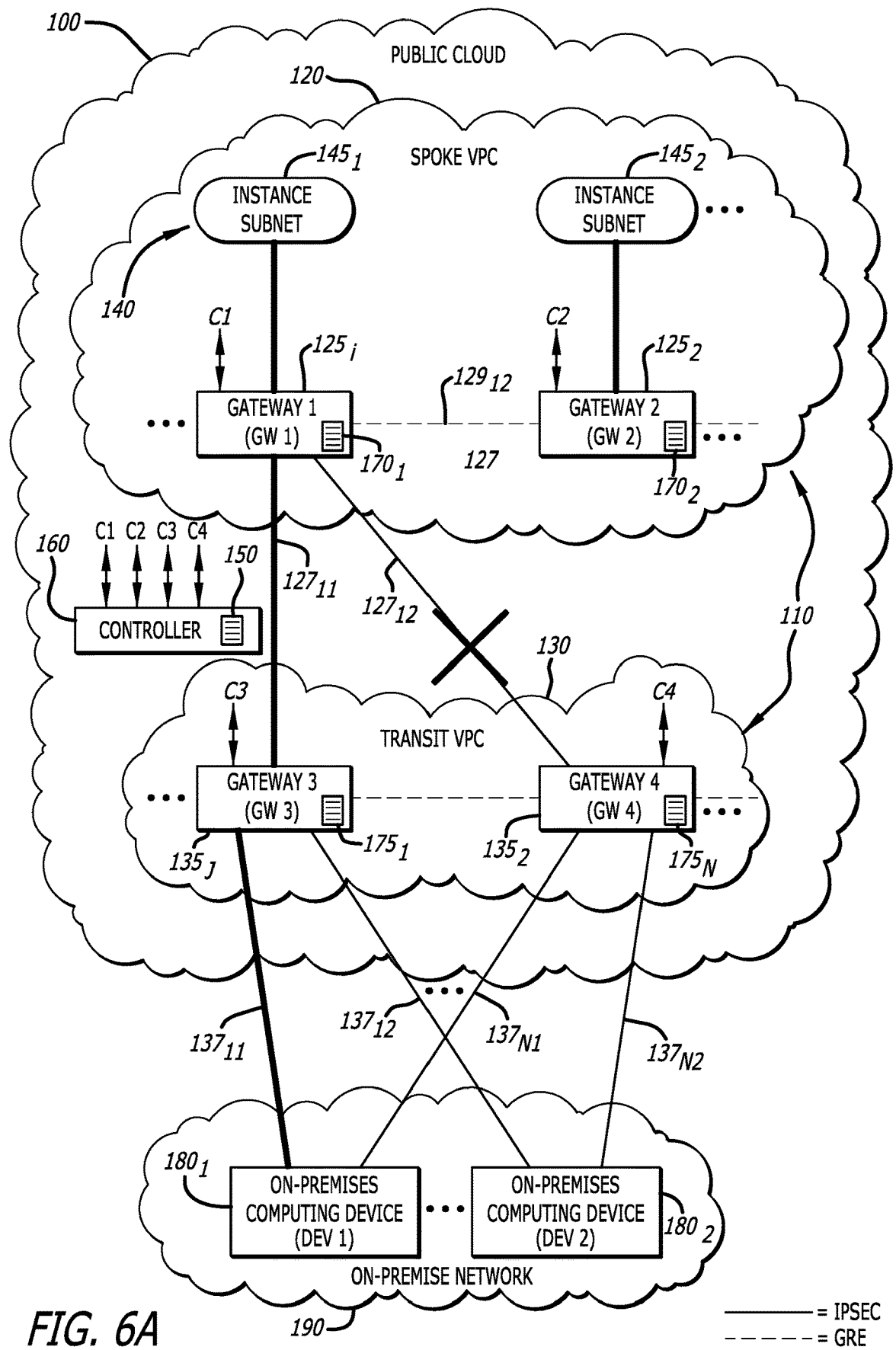
FIG. 6A is a diagram of an exemplary embodiment of the public cloud computing platform supporting communications between multiple virtual private cloud networks over a first communication link (IPSec tunnel) in response to failure of a second communication link (IPSec tunnel) formerly utilized by the virtual private cloud networks.
Figure 6B:
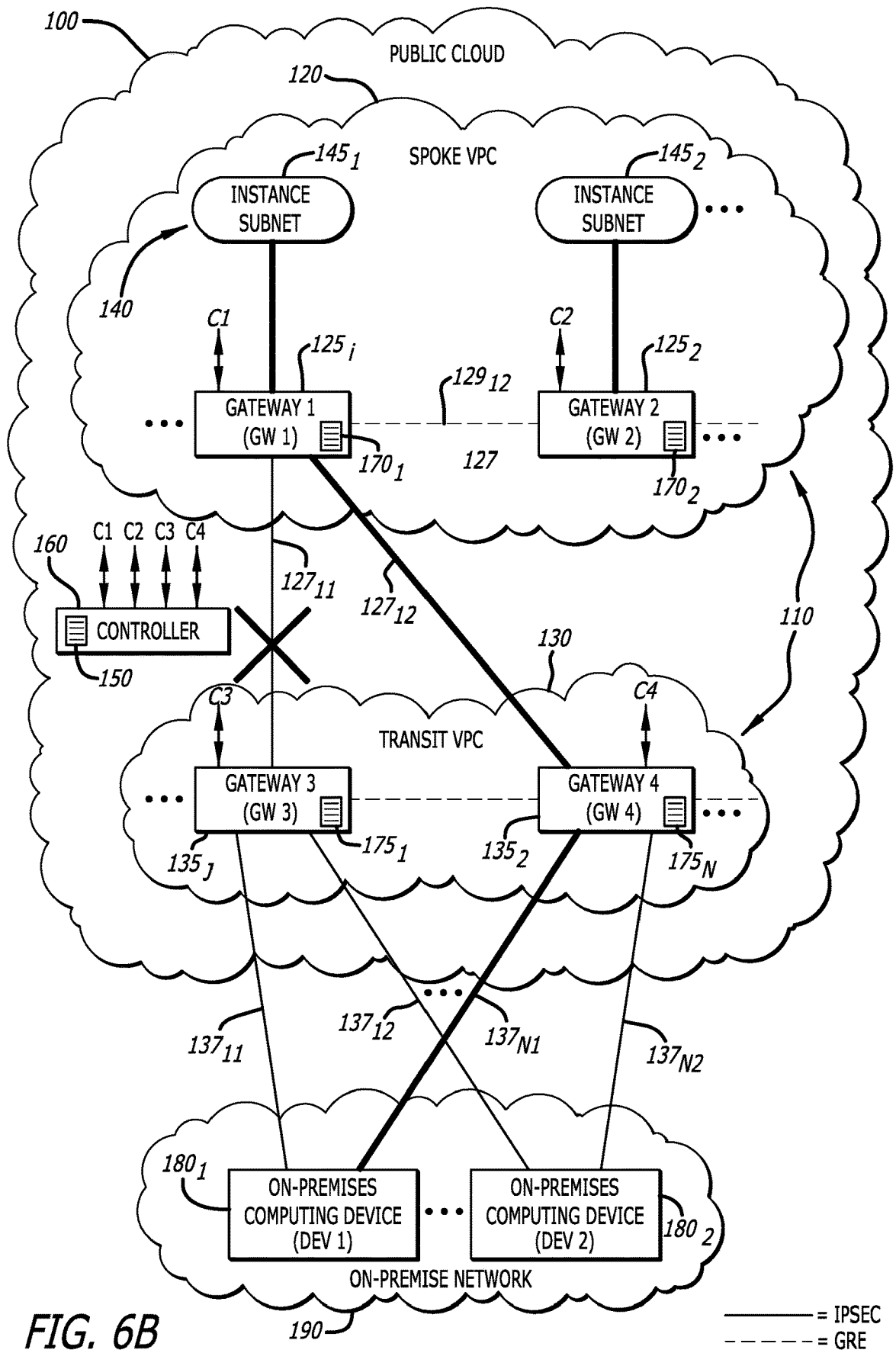
FIG. 6B is a diagram of an exemplary embodiment of the public cloud computing platform of FIG. 6A supporting communications between multiple virtual cloud networks over the second communication link in response to failure of the first communication link.
Figure 6C:
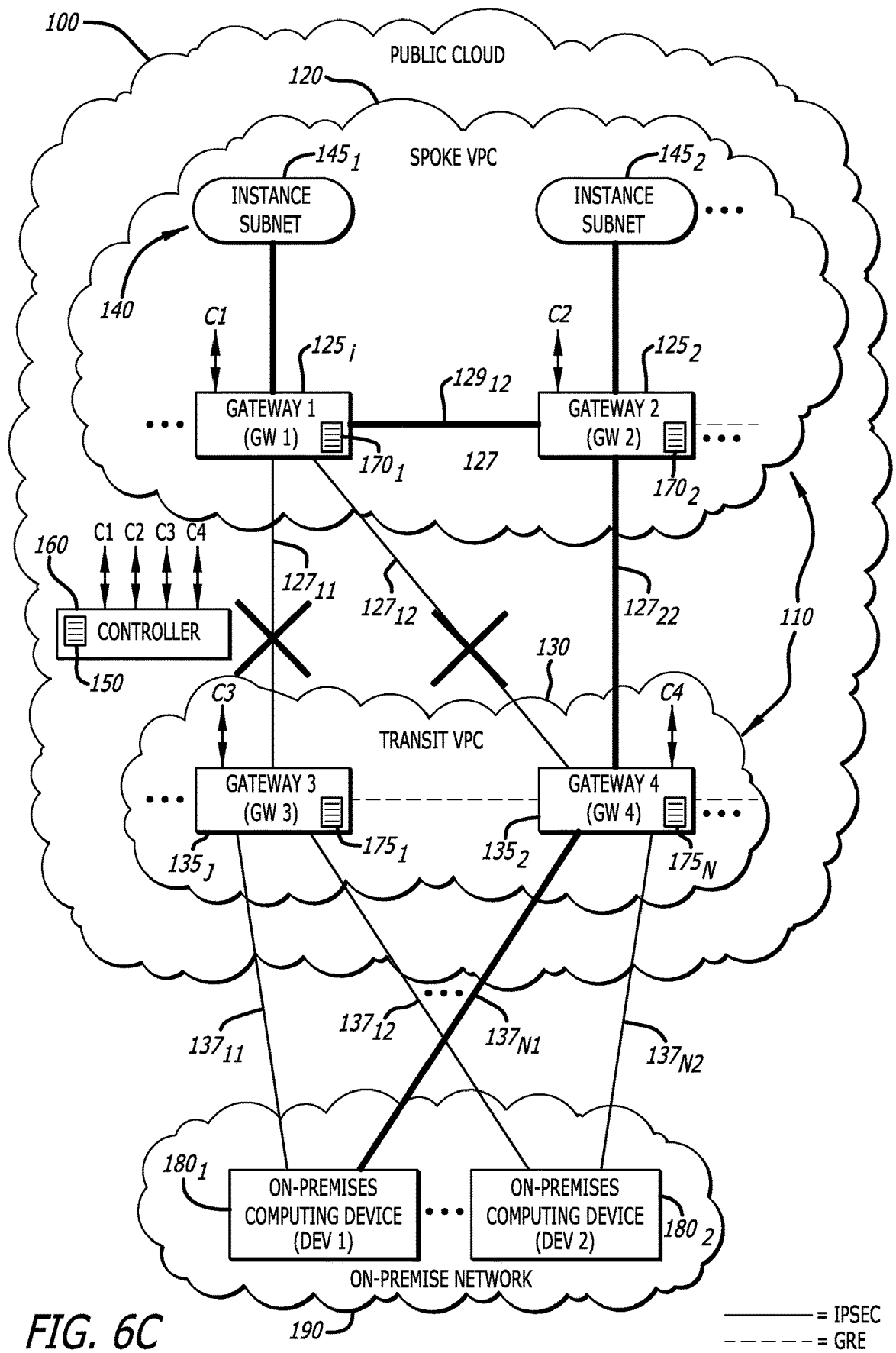
FIG. 6C is a diagram of an exemplary embodiment of the public cloud computing platform of FIG. 6A supporting communications between multiple virtual private cloud networks over a secondary tunnel in response to failure of the first and second communication links.

In response to a communication path failure, such as an IPSec tunnel becomes disabled for example, the spoke or transit gateway associated with the failed IPSec tunnel disables the communication link (routing path) by altering the VTI state within an entry associated with the disabled IPSec tunnel (blocks 540 and 550; FIGS. 6A-6B). Thereafter, the gateway determines whether all IPSec tunnels from the gateway directed to next hop have become disabled (block 560). If not, a different IPSec tunnel available to the gateway is used (block 565). If so, the gateway utilizes the secondary tunnel as a route for data traffic to the next hop via another gateway (block 570; FIG. 6C). This process continues until one of the IPSec tunnels returns to an active state. In the meantime, the gateways monitor whether the failed IPSec tunnel is returned to "active" status (block 580). If so, the gateway recovers the failed IPSec tunnel by returning the IPSec tunnel to the gateway routing table upon returning the VTI state to "active" status and gracefully discontinuing routing over the secondary tunnel (block 590), where IPSec tunnel status is continued to be monitored.

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. A network system comprising:
    a first virtual private cloud network including a first plurality of gateways, each gateway of the first plurality of gateways being in communication with one or more other gateways of the first plurality of gateways over one or more communication links uniquely corresponding to the one or more other gateways, each of the one or more communication links operating in accordance with a tunnel protocol; and
    a second virtual private cloud network including a second plurality of gateways, each of the second plurality of gateways being communicatively coupled to the each of the first plurality of gateways over peer-to-peer communication links operating in accordance with a security protocol, wherein
    each of the peer-to-peer communication links is set to a selected equal cost multi-path (ECMP) routing metrics, and
    each of the one or more communication links is assigned a higher ECMP routing metric than any ECMP routing metric assigned to a peer-to-peer communication link of the peer-to-peer communication links.

2. The network system of claim 1, wherein a first gateway of the first plurality of gateways being in communication with at least a second gateway of the first plurality of gateways over a communication link of the one or more communication links operating in accordance with a Generic Routing Encapsulation (GRE) tunnel protocol to secure communications between each of the first plurality of gateways for subsequent communication to one of the second plurality of gateways.

3. The network system of claim 2, wherein each of the first plurality of gateways and the second plurality of gateways correspond to a virtual machine (VM)-based data routing component, each of the first plurality of gateways is assigned a Private IP address within an IP address range associated with a first virtual private cloud network and each of the second plurality of gateways is assigned a Private IP address within an IP address range associated with a second virtual private cloud network different than the first virtual private cloud network.

4. The network system of claim 1, wherein the communication link of the one or more communication links is active when no peer-to-peer communication links communicatively coupled to the first gateway of the first plurality of gateways is active.

5. The network system of claim 1, wherein the security protocol corresponds to an Internet Protocol Security (IPSec) protocol.

6. The network system of claim 1, wherein each of the peer-to-peer communication links is set to identical ECMP routing metrics to achieve load-balancing.

7. The network system of claim 1, wherein each of the peer-to-peer communication links is assigned a different routing weight to achieve load-balancing, the weight being based on bandwidth capacity.

8. The network system of claim 1, wherein responsive to a peer-to-peer communication link of the peer-to-peer communication links failing, a gateway of the first plurality of gateways updates a gateway routing table autonomously by disabling a virtual tunnel interface corresponding to the failed peer-to-peer communication link without reliance on activity by a controller that manages operability of a full-mesh network including the peer-to-peer communication links.

9. The network system of claim 1, wherein the second virtual private cloud network supports communications between the first virtual private cloud network and an on-premises network.

10. The network system of claim 9, wherein the second plurality of gateways being communicatively coupled to the each of the first plurality of gateways over the peer-to-peer communication links and the on-premises network.

11. A network system comprising:
a first plurality of gateways, wherein a first gateway of the first plurality of gateways being in communication with at least a second gateway of the first plurality of gateways over a first communication link, the first communication link operating in accordance with a tunnel protocol; and
a second plurality of gateways, each of the second plurality of gateways being communicatively coupled to the each of the first plurality of gateways over peer-to-peer communication links operating in accordance with a security protocol, wherein
each of the peer-to-peer communication links is set to a selected equal cost multi-path (ECMP) routing metrics, and
the first communication link is assigned a higher ECMP routing metric than any ECMP routing metric assigned to a peer-to-peer communication link of the peer-to-peer communication links.

12. The network system of claim 11, wherein the first communication link operating in accordance with a Generic Routing Encapsulation (GRE) tunnel protocol to secure communications between each of the first plurality of gateways for subsequent communication to one of the second plurality of gateways.

13. The network system of claim 12, wherein the second plurality of gateways being communicatively coupled to the each of the first plurality of gateways over the peer-to-peer communication links and an on-premises network.

14. The network system of claim 12, wherein each gateway of the first plurality of gateways operates as a spoke gateway and each gateway of the second plurality of gateways operates as a transit gateway so that (i) each spoke gateway supports the peer-to-peer communication links in an active state to each of the transit gateways and (ii) each transit gateway supports the peer-to-peer communication links in the active state to each of the spoke gateways as well as an active peer-to-peer communication link to each on-prem computing device.

15. The network system of claim 11, wherein the first communication link becomes active when no peer-to-peer communication links communicatively coupled to the first gateway from the second plurality of gateways is active.

16. The network system of claim 11, wherein the security protocol corresponds to an Internet Protocol Security (IPSec) protocol.

17. The network system of claim 11, wherein each of the peer-to-peer communication links is set to identical ECMP routing metrics to achieve load-balancing.

18. The network system of claim 11, wherein each of the peer-to-peer communication links is assigned a different routing weight to achieve load-balancing, the weight being based on bandwidth capacity.

19. The network system of claim 11, wherein responsive to a peer-to-peer communication link of the peer-to-peer communication links failing, the first gateway updates a gateway routing table autonomously by disabling a virtual tunnel interface corresponding to the failed peer-to-peer communication link without reliance on activity by a controller that manages operability of a full-mesh network including the peer-to-peer communication links.

* * * * *